Patented Dec. 29, 1942

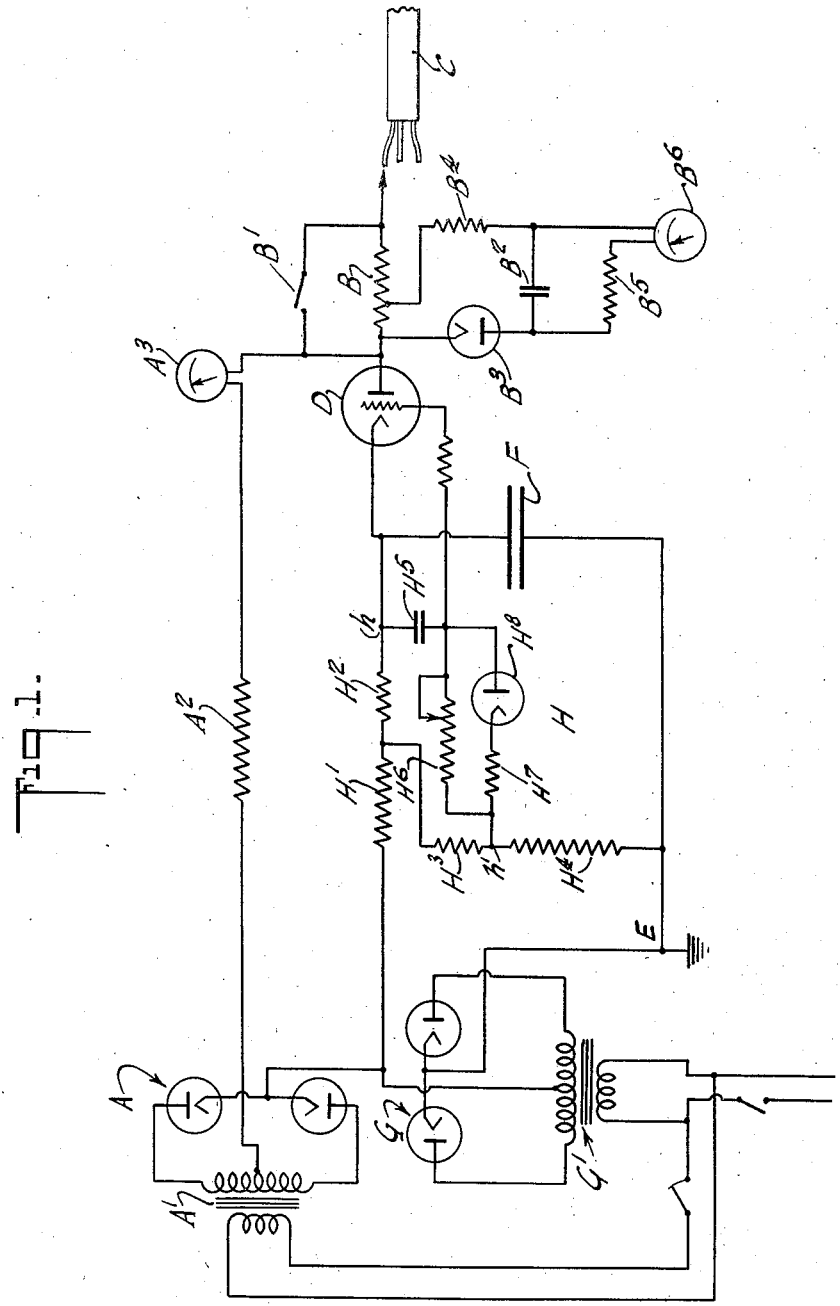

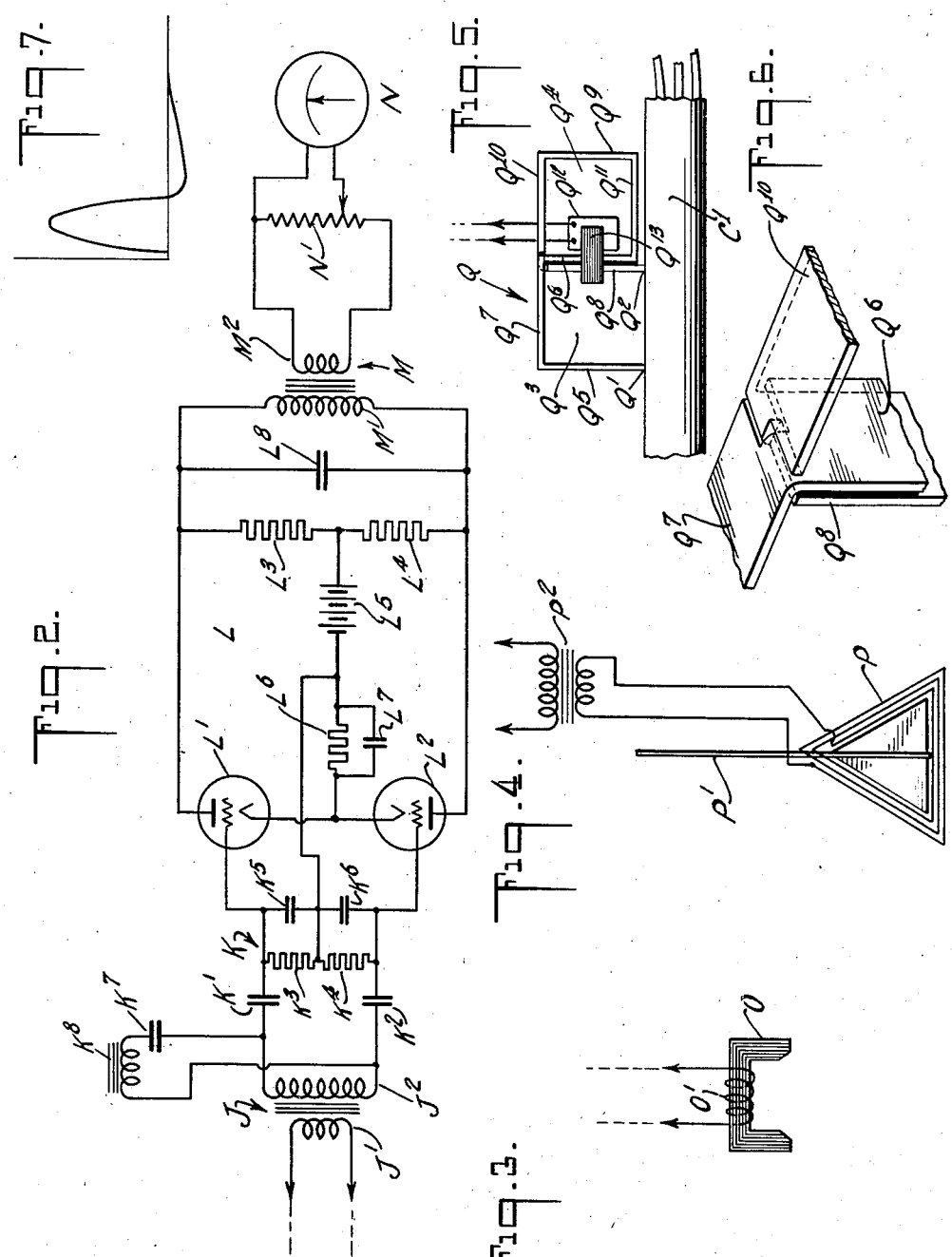

2,306,783

UNITED STATES PATENT OFFICE 2,306,783

ELECTRIC CABLE TESTING DEVICE

Thomas Lincoln Hall, Upper Montclair, N. J.

Application May 22, 1940, Serial No. 336,506

27 Claims. (Cl. 175—183)

This invention relates to apparatus for testing electric cables for faults such as are occasioned by a break down in the electrical insulation therein.

Electric cables consist usually of a plurality of conductor elements insulated from each other and from a metal sheath wherein the conductors are enclosed, the sheath in well designed systems being grounded at suitably spaced intervals. The faults occurring in such cables are attributable to a break down in the insulation resulting either in a short circuit between the conductor elements or in a conductive path through the defective insulation to the cable sheath and thence to ground through the ground connections of the cable between which the fault is located.

The improved apparatus is materially more economic as regards manufacturing cost than present commercial apparatus having an equivalent range of use.

Essentially the apparatus consists of a transmitter adapted to be connected at a cable terminal between two conductors where the fault consists of a short circuit therebetween, or between a conductor and ground where the defective insulation has resulted in establishing a conductive path from the conductor to the cable sheath. The transmitter includes a space discharge device having an electrode for controlling its conductivity and an output circuit adapted to be connected to the conductor to be tested. In the input circuit of the space discharge device, here is provided a condenser adapted to be charged in a suitable manner, as for instance from a rectified source of alternating current, and which is discharged through the space discharge device into the conductor to which it is connected, at timed intervals, to transmit a periodic unidirectional current impulse out along the same. The timed discharge of the condenser through the space discharge device is controlled by an electrical circuit connected to the control electrode of the discharge device and which has electrical constants such that when a predetermined charge has been built up in the condenser the voltage on the electrode will be varied so as to permit the discharge device to fire. The transmitter further includes a circuit portion designed to transmit a constant current out along the conductor so as to carbonize the fault and maintain it at low resistance, and another circuit portion for indicating the distance from the cable terminal out to the fault.

The apparatus further includes a pickup or detecting circuit for use in the field, and which includes one or another of a series of pickup elements depending upon the type of fault and its location, means for amplifying the detected impulses, and a galvanometer to indicate the intensity and polarity of the detected impulse which, as will later appear, determines the location of the fault.

Referring to the drawings:

Fig. 1 is a diagrammatic illustration of an impulse transmitter equipped with the present improvements;

Fig. 2 is a diagrammatic illustration of the impulse detecting circuit and amplifier;

Fig. 3 is an illustration of a magnetic type of pickup device for use with the circuit shown in Fig. 2;

Fig. 4 is an illustration of a loop type pickup device for use with the circuit shown in Fig. 2, and primarily intended for service in water-filled man-holes;

Fig. 5 is an illustration of another type of pickup device for use with the circuit shown in Fig. 2, and designed for detecting the cable sheath current;

Fig. 6 is a fragmentary perspective view of a portion of the pickup device shown in Fig. 5; and Fig. 7 is a curve indicating the characteristics of the detected impulses.

When the device is in service (Fig. 1), a small direct current for maintaining conductivity across the fault is supplied by full wave rectifiers A and G series connected, the rectifier A being connected to the high voltage secondary winding of a transformer $A^1$, and the rectifier G to the high voltage secondary winding of a transformer $G^1$, the respective primary windings of the transformers being connected to a suitable A. C. source not shown. The direct current passes through a relatively high resistance $A^2$ to a meter $A^3$ for indicating the size of the current and thence through another resistance B (the purpose of which will appear hereinafter), to the faulty conductor of a cable C which conductor will previously have been determined. Also connected to the faulty conductor of the cable through the resistance B, is the plate electrode of a three element space discharge device D through which periodic unidirectional impulses are transmitted to the conductor. Between the cathode of the space discharge device, which, of course, is suitably energized from a source not shown, and a ground connection as at E, there is connected a relatively large condenser F charged from the full wave rectifier G. It is unnecessary to charge the condenser through both rectifiers since the charging voltage need not be as high as that necessary to supply the current for breaking down and maintaining the fault. It is the discharge of the condenser F through the space discharge device D to the faulty conductor that produces the periodic impulses for test purposes.

The charging and discharging of the condenser F is controlled by a timing circuit H illustrated merely by way of example since other circuits could be used with equal facility. The circuit includes two resistance elements $H^1$ and $H^2$ connected in series between the cathode of the space discharge device D and the mid-point of the secondary winding of the transformer $G^1$ from which the rectifier G is energized. Two other series connected resistances $H^3$ and $H^4$ are connected at a point between the resistances $H^1$ and $H^2$ and to ground. A condenser $H^5$ of much lower capacity than the condenser F, is connected between the cathode as at $h$ and the grid of the space discharge device D and this condenser in turn at the side adjacent said grid is connected through two parallel paths to a point $h^1$ between the resistances $H^3$ and $H^4$, one of said parallel paths including a variable resistance $H^6$ and the other a resistance $H^7$ and a unidirectional diode $H^8$.

In order fully to comprehend the manner in which the circuit operates to control the charging and discharging of the condenser F, it will be best to consider a cycle of operation starting with a condition of zero voltage across the condenser F, i. e., just after the same has been fully discharged. Thus, when the voltage across the condenser F is zero, the voltage across the series connected resistances $H^1$ and $H^2$ together will be the full rectifier voltage, whereas the voltage across the resistance $H^2$ alone will be the same as that across the series connected resistances $H^3$ and $H^4$. Since the ground connection E has the highest positive potential in the circuit, the point $h^1$ between the resistances $H^3$ and and $H^4$ will be negative with respect to the point $h$ which has the same potential as the cathode of the space discharge device. The condensers F and $H^5$ start to charge at the same instant, the latter charging through the diode $H^8$ and the resistance $H^7$. The condenser $H^5$ charges at a much higher rate than the condenser F and will be fully charged when the voltage across it equals the voltage difference between the points $h$ and $h^1$. This is for the purpose of maintaining the grid of the space discharge tube negative with respect to the cathode, the constants of the circuit being such that the charging of the condenser $H^5$ is completed in a relatively short period of time.

The charging of the condenser F continues, the voltage at $h^1$ becoming equal to the voltage at $h$ and then positive with respect to the voltage at $h$. Thereupon the condenser $H^5$ starts to discharge through the resistance $H^6$. The discharge of the condenser $H^5$ renders the potential on the grid of the space discharge device D less negative until finally a point is reached where the space discharge device fires permitting both the condenser F and the condenser $H^5$ to discharge through the space discharge device D into the cable conductor. The constants of the circuit H are such that the firing of the space discharge device occurs in two to three seconds after the condenser F starts to charge. This can be regulated by the resistance $H^6$ which is made variable for the purpose, although in any case the resistance will be relatively high. The output resistance B in the plate circuit of the space discharge device D limits the size of the discharge current to the surge rating of the discharge device D. The electrical constants of the cable circuit C tend to make the discharge of the condenser F oscillatory causing the potential across the space discharge device to be reversed which thereupon deionizes and becomes non-conducting. Thereafter the condenser F starts to recharge and the cycle is repeated.

The result of the condenser discharge is an intense unidirectional current impulse repeated every two or three seconds depending upon the circuit timing, and which flows out along the conductor to the fault, returning through ground or through the other conductor if the fault be a short circuit. In the latter instance, the connection at E will be to the second conductor instead of to ground as shown. When the distance from the transmitter out to the fault is relatively great, the current limiting resistor B may be dispensed with, a short circuiting switch $B^1$ being shown for the purpose.

At this point, it might be stated that the direct current circuit, i. e., the one containing the resistance $A^2$ and the rectifier A acts to stabilize the timing of the discharge device D by maintaining a conductive path across the fault at all times. It might also be stated, that the timing circuit has been designed so that the resistances therein will serve automatically to drain the condensers when the transmitting apparatus is de-energized.

In order to give an indication of the distance from the cable terminal where the transmitter is located, out to the fault, there is provided a circuit which includes a condenser $B^2$ connected across a portion of the current limiting resistor B and which charges through a one-way diode $B^3$ and a resistance $B^4$ when the space discharge device D is discharging through the current limiting resistor B. The condenser then discharges through a resistance $B^5$ and a current measuring instrument $B^6$ (discharge through the one-way diode being impossible). From the reading of the instrument, the distance to the fault can be readily calculated, assuming the readings are known that the instrument would give when the cable is short-circuited at the near end, and also when the cable is free of faults but grounded at the remote end. These latter two readings can readily be determined in the field.

The periodic impulses sent out by the transmitter are detected in the field in order to obtain an indication as to the location of the fault. Where the fault consists of a conductive path from a conductor to the cable sheath and thence to ground, the impulse current will flow out over the conductor through the fault to the sheath and then divide, one portion of the current passing along the sheath to the ground bond thereof at the near side of the fault and another portion of the current passing along the sheath to the ground bond thereof at the far side of the fault. On the other hand, where the fault is a short circuit between two conductors, the impulse current will flow out over one conductor and thence back to the cable terminal over the other conductor. Regardless of the type of fault, however, the pickup devices herein described will serve to locate and isolate it.

The pickup apparatus includes one or another of the devices shown in Figs. 3, 4 and 5 together with the circuit shown in Fig. 2, said circuit including in general, an input transformer J, an input network K, an amplifier circuit L, an output transformer M, and a galvanometer N which will indicate both positive and negative deflections.

The pickup device shown in Fig. 3 consists of a U-shaped magnetic core O having a single winding $O^1$ which in service is connected to the primary winding $J^1$ of the input transformer of the amplifier circuit, which primary winding is designed to match the impedance of the pickup device as well as the impedance of the other pickup devices later to be described. In use the U-shaped pickup device is held in the vicinity of the cable in a plane at right angles thereto so that the magnetic field produced by the current impulse flowing along the faulty conductor of the cable C will induce a voltage impulse in the pick up device which is amplified and indicated by the galvanometer N.

The pickup device O is polarized so that a net current flowing away from the cable terminal will produce a positive deflection of the galvanometer, whereas a net current toward the cable terminal will produce a negative deflection thereof. Where the fault is a short circuit between two conductors, a rotation of the pickup device around the cable will cause the galvanometer deflection to change from positive to negative until the fault is reached. Beyond the fault, no deflection of the galvanometer will result since under the conditions stated, the transmitted impulse does not pass beyond the fault.

Where the fault consists of a conducting path from a conductor to the cable sheath, a rotation of the pickup device around the cable will not change the positive deflection of the galvanometer until near the fault where there will be sheath current flowing back in the direction of the transmitter at the near side of the fault and in the direction away from the transmitter beyond the fault for reasons heretofore mentioned. Consequently just before the fault is reached, a rotation of the pickup device around the cable will change the galvanometer deflection from positive to negative, whereas beyond the fault the deflection again will be positive only since the only current there will be the sheath current flowing away from the fault.

The pickup device shown in Fig. 4 is designed for use in manholes filled with water. It consists of a waterproof loop P mounted at the end of a long stick $P^1$ of non-conducting material and which is connected with the primary $J^1$ of the input transformer J of the amplifier through a transformer $P^2$. The loop can be raised and lowered along the walls of the man-hole until the signal is picked up. It is polarized so as to give positive and negative galvanometer deflections for net currents flowing away from and toward the transmitter end of the conductor respectively.

The pickup device Q illustrated in Figs. 5 and 6 is for use solely in detecting sheath current. It presents two spaced terminals $Q^1$ and $Q^2$, and is so bent that when the terminals are in contact with the cable sheath $C^1$, two series connected loops $Q^3$ and $Q^4$ are provided, arranged edge to edge and of substantially the same size. One loop consists of two spaced vertical legs $Q^5$ and $Q^6$, a horizontal leg $Q^7$ and the cable sheath, whereas the other loop consists of two spaced vertical legs $Q^8$ and $Q^9$ and two spaced horizontal legs $Q^{10}$ and $Q^{11}$. The device is made of copper, the two adjacent legs $Q^8$ and $Q^6$ being insulated from each other and magnetically coupled with a coil $Q^{12}$ by means of an iron core $Q^{13}$ threading therethrough and encircling said legs. When the terminals are placed in contact with the sheath, the device provides a shunt path for a portion of the sheath current and since the current flow through the adjacent legs $Q^8$ and $Q^6$ is in the same direction, the voltage induced in the coil $Q^{12}$ will be just double that which would be induced were the coil magnetically coupled with one leg only of the device.

On the other hand, since the loops $Q^3$ and $Q^4$ are of substantially the same size, they interlink with the same amount of magnetic flux produced by the current impulses flowing through the cable. Consequently the voltages induced in the loops as a result of the interlinking flux will be equal and opposite, and consequently will have no tendency to induce a voltage in the coupled coil $Q^{12}$. The latter coil is connected to the input of the transformer J of the amplifier circuit as in the case of the other pickup devices.

The sheath current pickup device Q is polarized so as to give a positive indication on the galvanometer for currents flowing from the fault back toward the cable terminal at the transmitter end and a negative indication for currents flowing from the fault in the opposite direction. Consequently the fault will be localized at the point on the cable where the reading of the galvanometer changes from positive to negative.

The pickup circuit shown in Fig. 2 is coupled to the pickup device, whichever one is used, through the input transformer J, the secondary winding $J^2$ thereof being connected to the condenser-resistance network K which includes two condensers $K^1$, $K^2$ and a pair of series connected resistors $K^3$, $K^4$, the condensers being connected one in each of the leads connecting the opposite ends of the transformer secondary with the opposite ends of the resistors. The network further includes a pair of condensers $K^5$, $K^6$ connected one across each of the resistors and which are likewise connected in the grid circuits of two amplifier tubes $L^1$ and $L^2$ connected in push-pull relation, one condenser being connected in the grid circuit of one of said tubes and the other condenser in the grid circuit of the other of said tubes. The resistances $K^3$ and $K^4$ serve to stabilize the grids during the intervals between signals.

The plate circuits of the amplifier tubes include each a plate resistance $L^3$, $L^4$ which are connected to the cathodes of the tubes through a common circuit portion which includes a plate or "B" battery $L^5$ and a resistance $L^6$. The grid circuits of the tubes have a common lead extending from a point between the two grid condensers $K^5$, $K^6$ and connected to the common portion of the plate circuits between the "B" battery $L^5$ and the resistance $L^6$ so that actually said resistance serves to provide a grid bias for the amplifier tubes. The grid bias resistor $L^6$ is shunted by a stabilizing condenser $L^7$ since the voltage drop across the resistance tends to fluctuate violently from the signal impulses.

The output circuit of the amplifier further includes the transformer M previously mentioned, having a primary winding $M^1$ connected across the resistances $L^3$ and $L^4$, and a secondary winding $M^2$ connected at its opposite ends to the galvanometer N through a shunt resistance $N^1$ which may be varied to control the sensitivity of the galvanometer.

While the impulses sent out by the transmitter are unidirectional, the form of the voltage wave induced in the various pick-up devices will be similar to that illustrated in Fig. 7, i. e., it will have positive and negative amplitudes of different values. Consequently the condensers $K^1$, $K^5$, $K^6$ and $K^2$ in the input circuit of the amplifier will be charged in series to a total voltage equal to the difference between the two voltage crests. The capacitance of the condensers $K^1$, $K^5$, $K^6$ and $K^2$ is such that by far the larger portion of the voltage drop will appear across the condensers $K^5$ and $K^6$. Consequently, the condenser charge will swing the grids of the amplifier tubes $L^1$ and $L^2$, one positive and the other negative, which potentials the grids will hold for a short time before the condensers are discharged as a result of the normal time electrical constants of the condensers and the transformer J. The variation in grid potential will, of course, appear as a change in the amplifier plate current, with an accompanying change in voltage across the plate resistors $L^3$, $L^4$ and hence as a change in the output of the transformer M to which the galvanometer N is connected. The galvanometer will be actuated by this voltage in a direction dependent upon the direction of the original impulse in the pickup device all as previously described.

Since the instant device is intended primarily for use on A. C. distributing systems, it is desirable to shunt the input transformer J of the pickup circuit with a condenser $K^7$ and an inductance coil $K^8$ tuned to the normal frequency of the system so as to prevent as much as possible that frequency from interfering with the detection of the testing impulses, and to the same end, the primary winding $M^1$ of the output transformer M is shunted by a condenser $L^8$ to by-pass such stray frequencies as may find their way through the amplifier tubes.

In the accompanying drawings, the invention has been shown merely in preferred form and by way of example, but obviously many variations and modifications may be made therein which will still be comprised within its spirit. For instance, wherever the specification and claims refer to a space discharge device, that term is intended to include any device provided with a pair of spaced electrodes between which an electric discharge can take place through an ionized gaseous medium and wherein the ionization of the gaseous medium can be controlled. It is to be understood, therefore, that the invention is not limited to any specific form or embodiment, except insofar as such limitations are specified in the appended claims.

Having thus described my invention, what I claim is:

1. Apparatus for locating a fault in the insulation of a conductor of an electric cable and which includes, in combination, a device provided with a plurality of electrodes spaced apart in a gaseous medium capable of being ionized to establish an electrically conductive path between the electrodes, which device in service is connected to the faulty conductor, a condenser connected for discharge into the faulty conductor through said device when the electrically conductive path is established, charging means for the condenser, means for causing the condenser periodically to discharge whereby current impulses are transmitted along the conductor to the fault and pickup means responsive to voltages induced from said current impulses for determining their presence at test positions along the conductor, said means including devices for prolonging the effect of the induced voltages beyond the duration of the current impulses.

2. Apparatus for locating a fault in the insulation of a conductor of an electric cable and which includes, in combination, a device provided with a plurality of electrodes spaced apart in a gaseous medium capable of being ionized to establish an electrically conductive path between the electrodes, which device in service is connected to the faulty conductor, a condenser connected for discharge into the faulty conductor through said device when the electrically conductive path is established, charging means for the condenser, means for varying the electrical conductivity of said device between the electrodes to establish said conductive path periodically whereby current impulses are transmitted along the conductor to the fault and pickup means responsive to voltages induced by said current impulses for determining their presence at test positions along the conductor, said means including devices for prolonging the effect of the induced voltages beyond the duration of the current impulses.

3. Apparatus for locating a fault in the insulation of a conductor of an electric cable and which includes, in combination, a device provided with a plurality of electrodes spaced apart in a gaseous medium capable of being ionized to establish an electrically conductive path between the electrodes, which device in service is connected to the faulty conductor, a condenser connected for discharge into the faulty conductor through said device when the electrically conductive path is established, charging means for the condenser, a control electrode for said device, means for automatically varying the potential of the control electrode periodically to establish said conductive path whereby current impulses are transmitted along the conductor to the fault and pickup means responsive to voltages induced by said current impulses for determining their presence at test positions along the conductor, said means including devices for prolonging the effect of the induced voltages beyond the duration of the current impulses.

4. Apparatus for locating a fault in the insulation of a conductor of an electric cable and which includes, in combination, a device provided with a plurality of electrodes spaced apart in a gaseous medium capable of being ionized to establish an electrically conductive path between the electrodes, which device in service is connected to the faulty conductor, a condenser connected for discharge into the faulty conductor through said device when the electrically conductive path is established, charging means for the condenser, a control electrode for said device, a timing circuit connected to said control electrode, said timing circuit acting automatically to vary the potential of the control electrode periodically to establish said conductive path whereby current impulses are transmitted along the conductor to the fault and pickup means responsive to voltages induced by said current impulses for determining their presence at test positions along the conductor, said means including devices for prolonging the effect of the induced voltages beyond the duration of the current impulses.

5. Apparatus according to claim 4, wherein the timing circuit includes resistance means through which the condenser will automatically discharge when the apparatus is deenergized.

6. Apparatus for locating a fault in the insulation of a conductor of an electric cable and which includes, in combination, a device provided with a plurality of electrodes spaced apart in a gaseous medium capable of being ionized to establish an electrically conductive path between the electrodes, which device in service is connected to the faulty conductor, a condenser connected for discharge into the faulty conductor through said device when the electrically conductive path is established, charging means for the condenser, a control electrode for said device, a timing circuit connected to said control electrode and adapted throughout a predetermined period during the charging of the condenser to maintain the control electrode at a potential rendering said device non-conductive and acting after the condenser has been charged to vary the potential of the control electrode to render said device conductive whereby a current impulse is transmitted along the conductor to the fault and pickup means responsive to a voltage induced from said current impulse for determining its presence at test positions along the conductor, said means including devices for prolonging the effect of the induced voltage beyond the duration of the current impulse.

7. Apparatus for periodically transmitting a current impulse along a conductor of an electric cable for testing the insulation thereof and which includes, in combination, a device provided with a plurality of electrodes spaced apart in a gaseous medium capable of being ionized to establish an electrically conductive path between the electrodes, which device in service is connected to a cable conductor, an input circuit for said device including a condenser adapted to be charged and discharged when said device is in non-conductive and conductive conditions respectively, means for charging the condenser, an electrode in said device for controlling the conductivity thereof, a timing circuit associated with the electrode, said timing circuit including a second condenser adapted to be charged at a substantially faster rate than the first mentioned condenser and acting when charged to maintain the control electrode at a potential that renders said discharge device non-conductive, and means in the timing circuit for permitting said second condenser to discharge when the first condenser is charged, the discharge of said second condenser acting to change the potential of the control electrode to a value that renders said device conductive thereby permitting the first condenser to discharge through the device and into the conductor.

8. Apparatus according to claim 7, wherein the means in the timing circuit that permits the second condenser to discharge is adjustable to vary the time interval between the conductive periods of the space discharge device.

9. Apparatus for locating a fault in the insulation of a conductor of an electric cable and which includes, in combination, a device provided with a plurality of electrodes spaced apart in a gaseous medium capable of being ionized to establish an electrically conductive path between the electrodes, which device in service is connected to the faulty conductor, an input circuit for said device including a condenser adapted to discharge into the faulty conductor through said device when the electrically conductive path is established, means including a full wave rectifier supplied from a source of alternating current for charging the condenser, means for periodically establishing said conductive path whereby current impulses are transmitted along the conductor to the fault and pickup means responsive to voltages induced by said current impulses for determining their presence at test positions along the conductor, said means including devices for prolonging the effect of the induced voltages beyond the duration of the current impulses.

10. Apparatus for determining the location of a fault in the insulation of a cable conductor and which includes in combination circuit devices comprising a condenser dischargeable to transmit periodic impulses along the cable conductor, and means for transmitting a direct current along the conductor simultaneously with the condenser discharge to stabilize the timing of such discharge.

11. Apparatus for determining the location of a fault in the insulation of a cable conductor and which includes in combination a space discharge device in the output circuit of which the conductor is adapted to be connected when undergoing test, the input circuit for the space discharge device including a condenser, means including rectifier devices for charging the condenser, means for causing the condenser periodically to discharge through the space discharge device into the cable conductor, and a circuit likewise energized from said rectifier devices for simultaneously transmitting a direct current along the cable conductor.

12. Apparatus for determining the location of a fault in the insulation of a cable conductor and which includes in combination a space discharge device in the output circuit of which the conductor is adapted to be connected when undergoing test, the input circuit for the space discharge device including a condenser, rectifier devices having a given output voltage, means including connections for utilizing a portion of said rectifier output voltage for charging the condenser, means for causing the condenser periodically to discharge through the space discharge device into the cable conductor, and a circuit energized by a larger portion of the rectifier output voltage for simultaneously transmitting a direct current along the cable conductor.

13. In apparatus for determining the location of a fault in the insulation of a cable conductor and which is equipped with circuit devices for transmitting periodic impulses along the cable conductor to the fault, a circuit for indicating approximately the distance from the transmitting devices out to the fault, which circuit includes a condenser, an indicating meter, and means for permitting the condenser to be charged by said periodic impulses and for preventing its discharge except through the indicating meter.

14. In apparatus for determining the location of a fault in the insulation of a cable conductor and which is equipped with circuit devices for transmitting periodic impulses along the cable conductor to the fault, a circuit for indicating approximately the distance from the transmitting devices out to the fault, which circuit includes a resistance through which the periodic impulses are transmitted to the cable conductor, a condenser connected across at least a portion of said resistance, an indicating meter and means for permitting the condenser to be charged by the potential drop across said resistance portion and for preventing its discharge except through the indicating meter.

15. Apparatus for locating a fault in the insulation of a cable conductor and which includes, in combination, a device for transmitting uni-directional current impulses along the conductor from a terminal thereof out toward the fault and pickup means for detecting said impulses comprising a galvanometer having a natural period greater than the duration of the individual current impulses and of a character giving positive and negative readings, a pickup element wherein a voltage of one polarity or another is induced according as the net current impulses at the point of test flow toward or away from the conductor terminal and an intermediate circuit between the pickup element and the galvanometer, said circuit being adapted to prolong the effect of the individual impulses upon the galvanometer and to produce a positive or negative reading thereof depending upon the polarity of the voltage impulses induced in the pickup element.

16. Apparatus for locating a fault in the insulation of a cable conductor and which includes, in combination, a device for transmitting uni-directional current impulses along the conductor from a terminal thereof out toward the fault and pickup means for detecting said impulses comprising a galvanometer having a natural period greater than the duration of the individual current impulses and of a character giving positive and negative readings, a pickup element wherein a voltage of one polarity or another is induced according as the net current impulses at the point of test flow toward or away from the conductor terminal, and an intermediate circuit including a push pull amplifier having a galvanometer connected in its output circuit and having an input circuit upon which the detected impulses are impressed, said input circuit having electrical constants adapted to prolong the individual effect of the detected impulses upon the amplifier to produce a positive or negative reading of the galvanometer depending upon the polarity of the voltage impulses induced in the pickup element.

17. Pickup apparatus for detecting uni-directional impulses transmitted along a conductor of an electrical cable from a terminal thereof in testing for faults in the conductor insulation, said pickup apparatus including, in combination, a galvanometer having a natural period greater than the duration of the individual current impulses and of a character giving positive and negative readings, a pickup element wherein a voltage of one polarity or another is induced according as the net current impulses at the point of test flow toward or away from the conductor terminal and an intermediate circuit between the pickup element and the galvanometer, said circuit being adapted to prolong the effect of the individual impulses upon the galvanometer and to produce a positive or negative reading thereof depending upon the polarity of the voltage impulses induced in the pickup element.

18. Pickup apparatus according to claim 17, wherein the intermediate connecting circuit includes a push-pull amplifier having an output circuit wherein the galvanometer is connected, and an input circuit connected to the pickup element, said input circuit including condenser means adapted to be charged by the voltage impulses induced in the pickup element and to retain said charges beyond their actual duration to enable them when amplified to give a positive or negative reading of the galvanometer according to their polarity.

19. Pickup apparatus according to claim 17, wherein the pickup element includes a U-shaped magnetic core having a polarized winding thereon connected to the intermediate connecting circuit and adapted when in use to be placed in a plane at right angles to the cable and in close proximity thereto to obtain the galvanometer reading.

20. Pickup apparatus according to claim 17, wherein the pickup element includes a polarized wire loop mounted upon a non-conducting frame and electrically connected to the intermediate connecting circuit, and adapted when in use to be placed in the vicinity of the cable under test in a position to link with the magnetic flux produced by the impulse current flowing therein to obtain the galvanometer reading.

21. Pickup apparatus according to claim 17, wherein the pickup device includes a loop of conducting material terminating in contact ends disposed in spaced relation and which are adapted when the device is in use to be placed in contact with the cable sheath so as to form a shunt path for current flowing therethrough, and a pluralized coil inductively coupled with the loop and connected to the intermediate connecting circuit.

22. A pickup device for detecting sheath current produced by a current impulse transmitted along a conductive element of an electric cable and which includes, a conducting element formed with two spaced terminals adapted when placed in contact with the cable sheath to present a shunt path for a portion of the sheath current, and shaped so as to provide with the portion of the sheath interconnecting the terminals, two loops with a leg of each adjacent one another, said loops being so disposed that the voltages induced therein as a result of their linkage with the flux produced by the impulse current will be neutralized and the shunt current flowing in the adjacent legs of said loops will be in the same direction, and a coil magnetically coupled with both said adjacent legs.

23. Apparatus for locating a fault in the insulation of a cable conductor and which includes, in combination, a device for transmitting uni-directional current impulses along the conductor from a terminal thereof out toward the fault and pickup means for detecting said impulses comprising a galvanometer having a natural period greater than the duration of the individual current impulses, a pickup element and an intermediate circuit between the pickup element and the galvanometer for prolonging the effect, upon the galvanometer, of said individual current impulses whereby to obtain a galvanometer reading thereof.

24. The method of locating a fault in the insulation of a cable conductor and which includes the steps of transmitting out along the conductor toward the fault, uni-directional current impulses at periodic intervals which are long as compared with their duration, and testing along the conductor length for the polarities of voltages induced from said current impulses by prolonging the effect of such induced voltages beyond the duration of the current impulses whereby to enable a reading of the voltage polarities to be taken, said voltage readings serving to indicate the direction of the fault from the point of test.

25. The method of locating a fault in the insulation of a cable conductor and which includes the steps of discharging a condenser into the conductor at one terminal thereof at periodic intervals which are long as compared with the duration of the condenser discharge, and testing along the conductor length for the polarities of voltages induced from the current impulses resulting from the condenser discharge, by prolonging the effect of such induced voltages beyond the duration of the current impulses whereby to enable a reading of the voltage polarities to be taken, said voltage readings serving to indicate the direction of the fault from the point of test.

26. The method of locating a fault in the insulation of a cable conductor and which includes the steps of transmitting out along the conductor toward the fault, uni-directional current impulses at periodic intervals which are long as compared with the duration of the impulses, and which, depending upon the location of the fault, will result, at different points of test along the conductor, in net current impulses toward or away from the transmitting terminal of the conductor, and obtaining an indication of the direction of said net current impulses by a voltage induced therefrom and which has one polarity or another depending upon the direction of said current impulses, and prolonging the effect of said induced voltages beyond the duration of said current impulses in order to obtain a reading of the polarity thereof.

27. The method of locating a fault in the insulation of a cable conductor and which includes the steps of discharging a condenser into the conductor at one terminal thereof at periodic intervals which are long as compared with the duration of the condenser discharge and which, depending upon the location of the fault, will result, at different points of test along the conductor, in net current impulses toward or away from said conductor terminal, and obtaining an indication of the direction of said net current impulses by making an observation of the polarity of the voltages induced therefrom by prolonging the effect of said induced voltages beyond the duration of said current impulses.

THOMAS LINCOLN HALL.

CERTIFICATE OF CORRECTION.

Patent No. 2,306,783. December 29, 1942.

THOMAS LINCOLN HALL.

It is hereby certified that error appears in the printed specification of the above numbered patent requiring correction as follows: Page 1, first column, line 34, for "here" read --there--; page 6, second column, line 25, claim 21, for "pluralized" read --polarized--; and that the said Letters Patent should be read with this correction therein that the same may conform to the record of the case in the Patent Office.

Signed and sealed this 16th day of March, A. D. 1943.

(Seal) Henry Van Arsdale,
Acting Commissioner of Patents